United States Patent Office 3,436,426
Patented Apr. 1, 1969

3,436,426
PROCESS FOR THE CONTINUOUS PREPARATION OF ADDITION PRODUCTS OF ETHYLENE OXIDE
Hannes Fischer, Wiesbaden, and Werner Stein, Erkrath-Unterbach, Germany, assignors to Henkel & Cie G.m.b.H., Dusseldorf-Holthausen, Germany, a corporation of Germany
Continuation-in-part of application Ser. No. 530,832, Mar. 1, 1966. This application Nov. 13, 1967, Ser. No. 693,037
Claims priority, application Germany, Mar. 11, 1965, H 55,437
Int. Cl. C07c 41/04
U.S. Cl. 260—613                          10 Claims

ABSTRACT OF THE DISCLOSURE

This invention relates to a process for the continuous production of ethoxylated alcohols by (a) continuously passing a mixture of organic compounds having reactive hydrogen atoms selected from the group consisting of alcohols, phenols, addition products of ethylene oxide thereof and addition products of propylene oxide thereof, with ethylene oxide in a molar ratio of 1:1 to 1:4 in the presence of the usual alkaline catalysts under a pressure at which the reaction mixture is kept in liquid form, through a jacketed reactor having a small cross-section compared to its length, (b) heating said mixture to such a degree that, after travelling through the first half of said jacketed reactor, a temperature of about 170 to 230° C. is attained, and that in the second half of said jacketed reactor said mixture passes through a maximum temperature of between about 240 to 330° C., (c) maintaining said mixture in said jacketed reactor for about 8 to 150 seconds, (d) maintaining the interval between the obtention of said maximum temperature and the time said mixture leaves said jacketed reactor between about 5% to 30% of the total duration of time said mixture is maintained in said jacketed reactor, (e) cooling said addition product to a temperature below 100° C., after said addition product leaves said jacketed reactor, and (f) recovering said addition product.

CROSS-REFERENCE AND CLAIM OF PRIORITY

Figure 1:
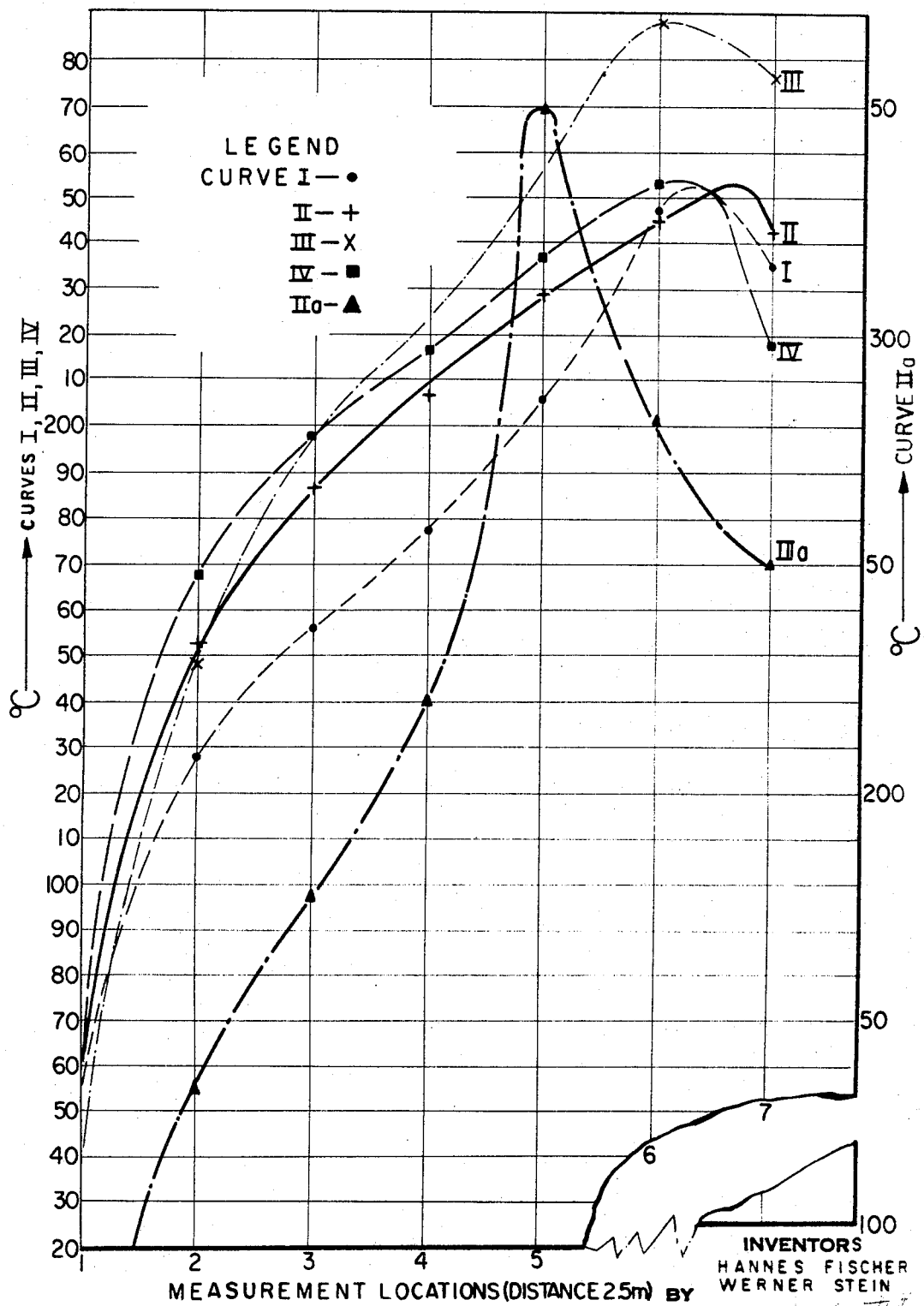
Figure 2:
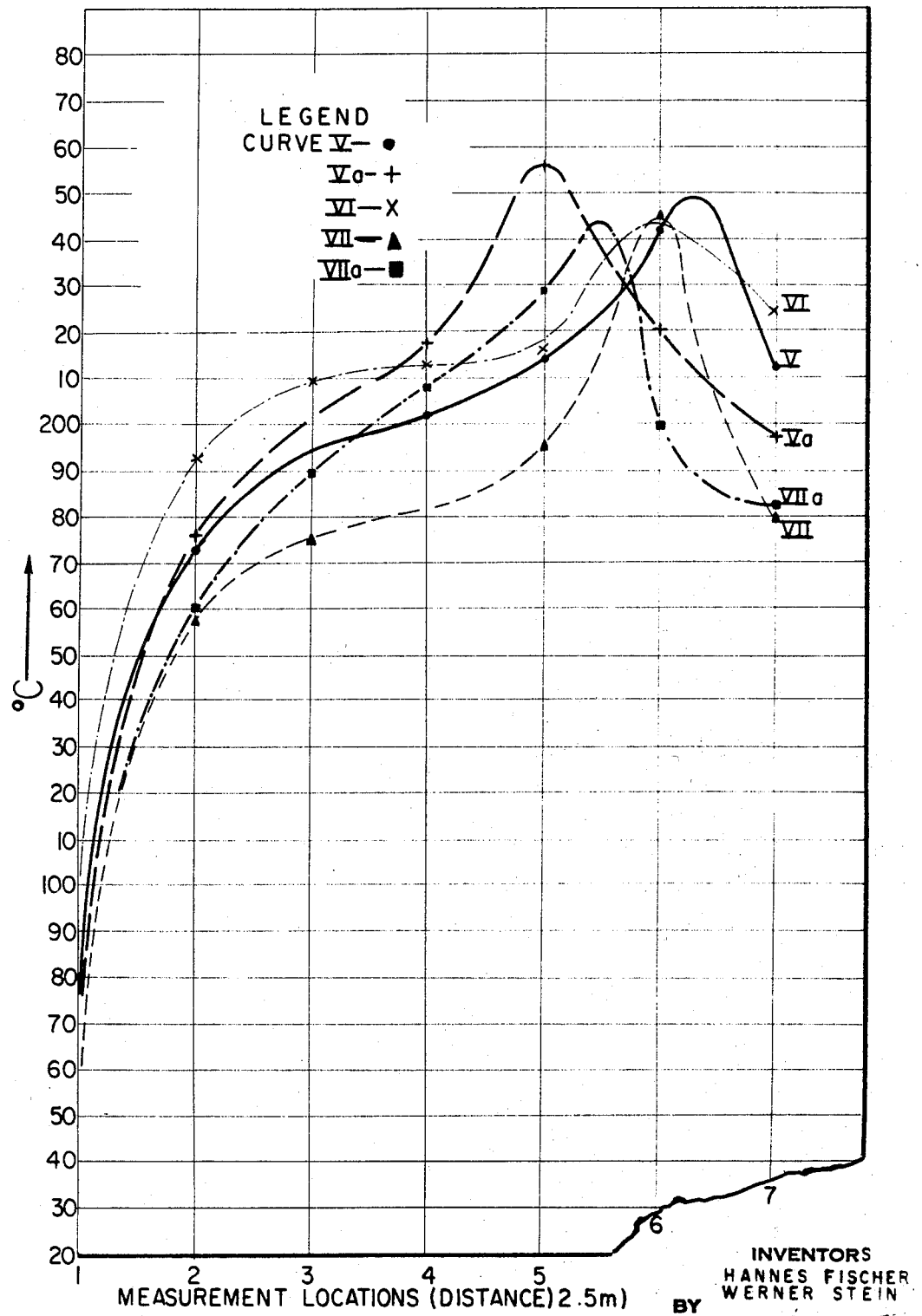
Figure 3:
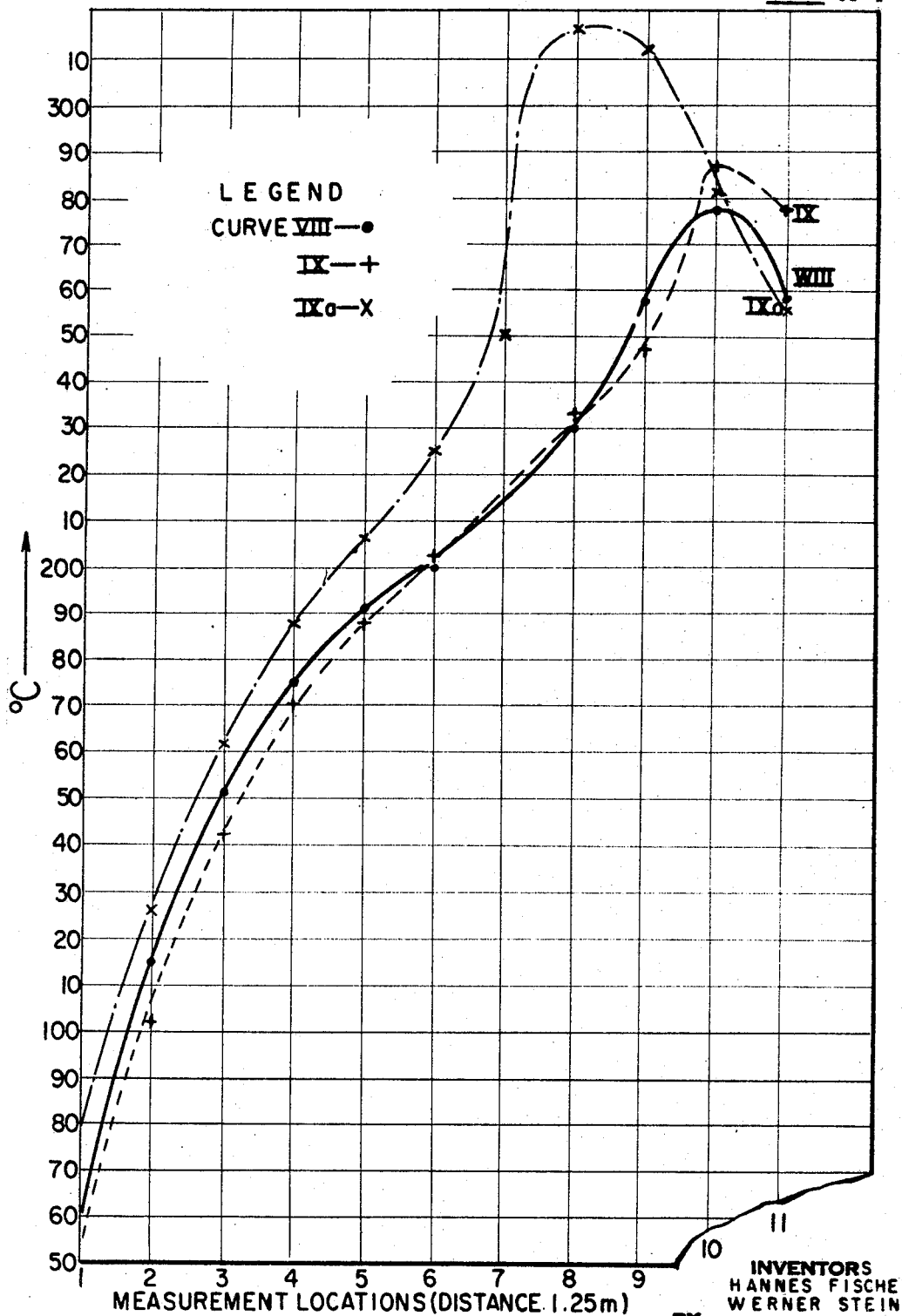
Figure 4:
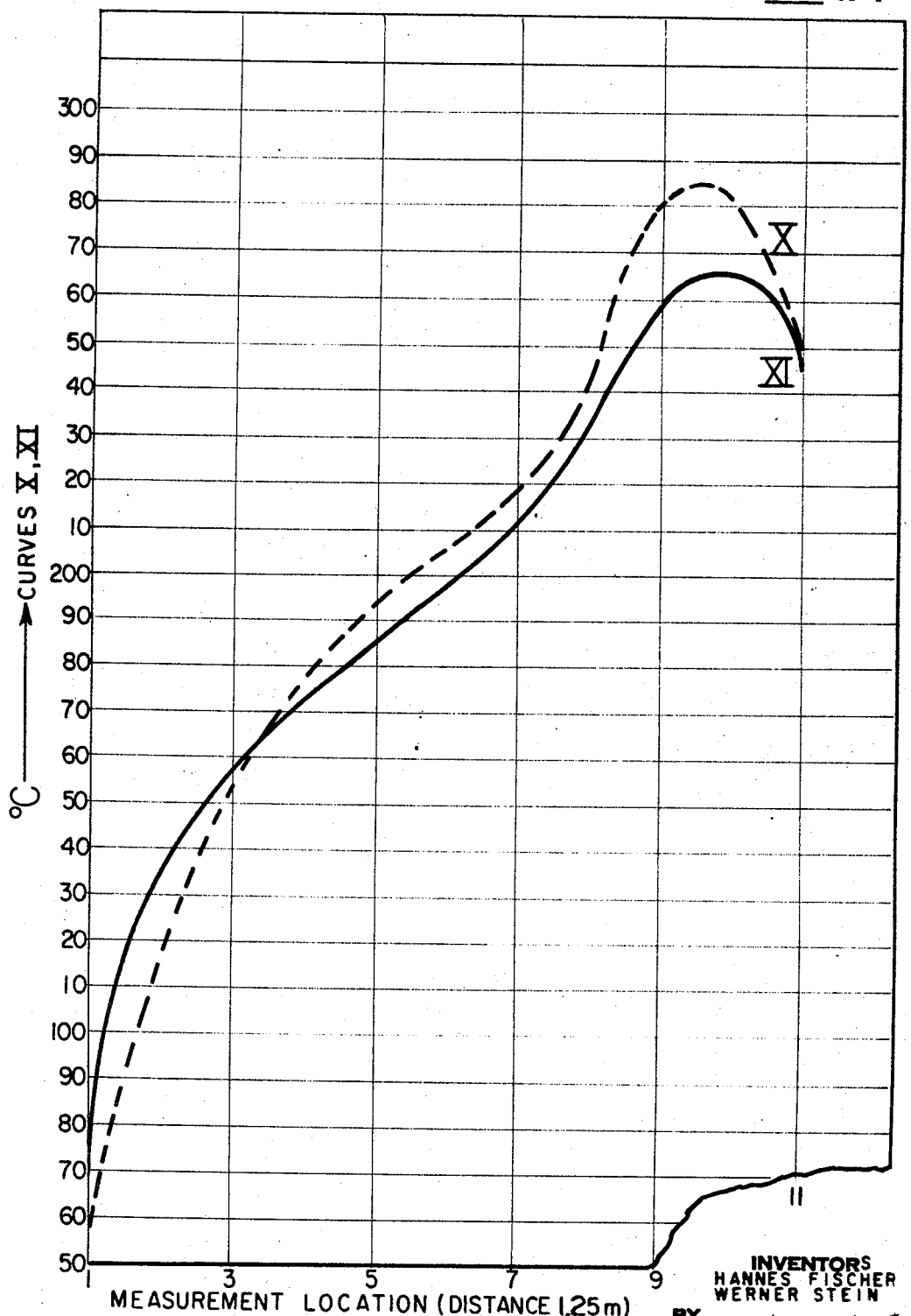

This application is a continuation-in-part of our co-pending application Ser. No. 659,244, filed May 5, 1967, and our earlier filed application Ser. No. 530,832, filed Mar. 1, 1966, both now abandoned.

Under the provisions of 35 U.S.C. 119, the right of priority is claimed, based on the corresponding German priority application H 55,437, filed Mar. 11, 1965.

THE PRIOR ART

According to Schönfeldt "Oberflächenaktive Anlargerungsprodukte des Äthylenoxyds" ("Surface-active addition products of the ethylene oxide"), Stuttgart, 1959, pp. 64–65, the continuous preparation of "Igepal C" is accomplished in high pressure tubes, having an interior diameter of 6 mm. and a length of 200 meters, said tubes being jacket encased. Oil is circulated through the jacket of these tubes to effect and to maintain the reaction temperature.

The reaction is conducted in the presence of alkaline catalysts under a pressure of 100 to 150 atmospheres. The temperature in the heating jacket must not exceed 150° C. When only half of the total amount of ethylene oxide is added, the temperature in the heating jacket can be raised to 170° C. and the temperature in the reaction tube can be increased to 210° C. without causing any disturbing secondary reactions.

This process was also described in the German Patent No. 735,418. Therein it is pointed out in particular, that the temperature of the heating liquid should not be increased beyond a specific degree, as otherwise a pronounced temperature gradient occurs in the interior of the reactor tube, thereby the desired reaction does not occur and a useless product is obtained.

To judge from the operation of Example 1 of this patent, it appears conclusive that, with the addition of 10 moles of ethylene oxide to 1 mole of isooctylphenol, the reaction temperature in the pressure reactor tube increases with a temperature of 160° C. in the heating jacket to 350° C. due to an intensely exothermic reaction, resulting in a dark, useless product. With the addition of 5 moles of ethylene oxide per mole of alcohol, according to Example 2, the temperature of the heating jacket can be increased to 170° C. with temperatures up to 210° C. being observed in the interior of the reactor tube. As a rule, however, reaction temperatures substantially below 200° C. are used.

According to the French Patent No. 947,250, a mixture of an organic hydroxyl compound, ethylene oxide and 0.01 to 1% of hexamethylenetetramine is forced through a spiral reactor tube at a temperature of about 100° C. and under a pressure which keeps the mixture in liquid form. The reaction times given are relatively extensive, for example, 1½ hours. The reaction is incomplete.

According to the published German Auslegeschrift 1,117,097, the continuous addition of ethylene oxide to organic hydroxyl compounds in a mole ratio of at least 4 to 1 is accomplished. The reaction mixture, preheated to a temperature between 50 and 190° C., is continuously and under pressure passed through an elongated reaction vessel, having a rather small cross-section compared with the length, and by eliminating the reaction heat, is maintained within the temperature range as indicated. The duration of passage of reactants in the reaction vessel amounts here to 5 to 60 minutes and the reaction mixture is adjusted so that 25 to 97%, preferably 75 to 90%, of ethylene oxide can be added to the hydroxyl compound.

Finally, there is described in the published German Auslegeschrift No. 1,061,764 a continuous process for the reaction of alkylene oxides with water or with alcohols under pressure. A reaction mixture, containing water or alcohol in excess, is passed through a pressure reactor tube. In this fashion, the addition of the ethylene oxide can be carried out in relatively short periods and at a comparatively high temperature. In the operation of Example 6, there are added to each one mole of octylphenol, 2 moles of ethylene oxide. The work is carried out in the presence of a large amount of an inert solvent (ethyl benzene). In the example where the work is conducted without solvents, the ethylene oxide amounts at the most to ⅛ mole per each mole of water or of alcohol.

The status of the prior art shows that, so far, the continuous addition of 1 mole or more of ethylene oxide to organic compounds containing reactive hydrogen atoms in the presence of the usual alkaline catalysts at temperatures substantially exceeding 200° C. has not been met with success to obtain thereby a corresponding increase in the volume-time-yield.

OBJECTS OF THE INVENTION

An object of the present invention is the development of a process for the continuous production of addition products of ethylene oxide with organic compounds having reactive hydrogen atoms comprising in combination the following steps: (a) continuously passing a mixture of organic compounds having reactive hydrogen atoms selected from the group consisting of alcohols, phenols, addition products of ethylene oxide thereof and addition products of propylene oxide thereof, with ethylene oxide in a molar ratio of 1:1 to 1:4 in the presence of the usual alkaline catalysts under a pressure at which the reaction mixture is kept in liquid from, through a jacketed reactor having a small cross-section compared to its length, (b) heating said mixture to such a degree that, after travelling through the first half of said jacketed reactor, a temperature of about 170 to 230° C. is attained, and that in the second half of said jacketed reactor said mixture passes through a maximum temperature of between about 240 to 330° C., (c) maintaining said mixture in said jacketed reactor for about 8 to 150 seconds, (d) maintaining the interval between the obtention of said maximum temperature and the time said mixture leaves said jacketed reactor between about 5% to 30% of the total duration of time said mixture is maintained in said jacketed reactor, (e) cooling said addition product to a temperature below 100° C. after said addition product leaves said jacketed reactor, and (f) recovering said addition product.

Another object of the present invention is the obtention of practically colorless addition products of ethylene oxide with organic compounds having reactive hydrogen atoms in high yields with very brief reaction times.

These and other objects of the invention will become more apparent as the description thereof proceeds.

DESCRIPTION OF THE INVENTION

It was startling to discover now that with very short durations and at reaction temperatures, the maximum of which substantially exceeds 200° C., high-grade, mostly transparent and nearly odorless products having a small content of by-products were obtainable on continuously reaction ethylene oxide with organic compounds having reactive hydrogen atoms, provided the following conditions are observed:

(a) Alcohols, phenols or addition products of ethylene oxide or of propylene oxide to the compounds mentioned are passed with ethylene oxide in a molecular ratio of 1:1 to 1:4 under a pressure which maintains the reaction mixture in liquid form and in the presence of the usual alkaline catalysts, through reactors with a small cross-section compared to the length, which are enclosed in a heat exchanger.

(b) The mixture is heated in a manner that, after travelling through the first half of the zone of the reactor enclosed in the heat exchanger, a temperature of between about 170 to about 230° C. is obtained, and that in the second half of this zone the mixture attains a maximum temperature of between about 240° C. and 330° C., preferably between about 240° C. and about 300° C.

(c) The duration of passage of the reaction mixture through the zone of the reactor surrounded by the heat exchanger amounts to about 8 to 150 seconds, preferably 15 to 80 seconds.

(d) The time between obtaining the maximum temperature and leaving the zone of the reactor surrounded by the heat exchanger does not amount to more than 5 to 30%, preferably 5 to 26%, of the entire duration of the passage of the reaction mixture through the reaction zone.

(e) Immediately after leaving the zone of the reactor surrounded by the heat exchanger, the product is cooled to a temperature below 100° C.

In the drawings, FIGURES I to IV show the reaction temperature curves of the various examples.

Serving as starting substances for the process of the invention are mono- of multihydric aliphatic or cycloaliphatic alcohols, preferably higher alcohols with 6 to 22 carbon atoms, which may be straight or branched, primary or secondary alcohols, and which may contain also one or several double bonds. Known examples for these alcohols are the fatty alcohols, oxoalcohols, secondary alkanols or products prepared from ethylene according to the Ziegler process. Preferable are primary and secondary alkanols and alkenols having from 6 to 22 carbon atoms.

Other suitable starting materials are phenols, in particular, alkylphenols, preferably containing 4 to 18 carbon atoms in the alkyl radical, which may be straight or branched.

The addition products of ethylene oxide or propylene oxide to the compounds mentioned above may also be used as starting substances. Propylene oxide addition products are secondary alcohols.

Since the process is not adaptable for the addition of essentially more than 4 mols of ethylene oxide in one process step, it is advantageous to add larger amounts of ethylene oxide not at one time but in two or even more steps, whereby the reaction product of the first step serves as starting substance for the next step.

For the process of the invention the usual alkaline catalysts are employed, for example, alkali metal hydroxide, such as sodium or potassium hydroxide, alkali metal alcoholates or phenolates or metallic sodium or potassium. As a rule, as is customary, the amount of the catalyst ranges between 0.01% to 1%, preferably between 0.05% to 0.2% by weight of alkali metal, based on the weight of the starting compounds to which ethylene oxide is to be added. It is of advantage to use anhydrous catalysts and, in the case of using caustic alkalis, to remove the water formed during the formation of the alcoholate from the mixture. Furthermore, it is advantageous when using alkali alcoholates of lower alcohols, to distill the latter prior to the reaction with ethylene oxide.

The pressure in the reactor should be selected so that the reaction mixture will always be in liquid form even at the elevated reaction temperatures of the invention. The pressure ranges advantageously between 50 and 110 atmospheres.

The reaction is conducted in reaction vessels which have a small cross-section in comparison with their length. For example, pressure tubes having a diameter of about 3 to 12 mm., preferably of about 5 to 10 mm., are suitable. Instead of these tubes, so-called ring-slit reactors may be used or reactors with an oval cross-section of an oblate form chosen at random. In any case, the reaction vessels should be of such a dimension as to render a sufficient heat exchange possible.

The length of the reactors at identical throughput in view of the short duration may be smaller than indicated in the process of the German Patent No. 735,418. It may amount, for example, to 10 to 100 meters when a tubular reactor is used.

The specific reaction zone is encircled by a heat exchanger which, on the one hand, renders a rapid heating of the reaction mixture possible and which, on the other hand, guarantees a sufficiently rapid evolution of the heat developed. The heat exchanger may be subdivided into several zones adjusted to various temperatures. However, this measure is not absolutely necessary. It has been found advantageous to use a single zoned heat exchanger. This can be filled with water and adjusted to the desired temperature by means of regulation by pressure. In this manner, due to the high heat of evaporation of the water, a specially effective cooling is attained. Instead of water, however, different media may be employed. The temperature of the heat exchanger is, as a rule, maintained between about 160° C. and 240° C.

The progress of the heat during the reaction in a specific apparatus can be controlled by the temperature of the heat exchanger, by the flow rate of the reaction mixture and by the type and amount of the catalyst chosen. It should be taken into consideration that the development of heat of the reaction mixture is considerably accelerated in proportion to the increasing ethylene oxide content.

Likewise, at identical molecular ratio more heat is liberated during the reaction of low molecular weight starting substances with ethylene oxide at identical reaction volume than when high molecular weight starting substances are used.

Since, in general, the starting material, the amount of the ethylene oxide to be added and the catalyst amount are known, and the reaction follows a known temperature progress, the temperature progress of the reaction can easily by adjusted by regulating either the flow rate or the duration of the reaction mixture in the reactor and the temperature in the heat exchange or both. For this purpose it is only necesary to measure the reaction temperatures in the various sections of the reaction vessel and to adjust either the flow rate or the temperature in the heat exchanger or both to effect the optimum continuous reaction.

The reaction mixture is first heated in such a manner that in the first half of the zone of the reactor, encircled by the heat exchanger, a reaction temperature of between 170° C. to 230° C. is obtained. The temperature of the heat exchanger is controlled in such a way that the reaction mixture in the second half of this zone attains a maximum temperature between about 240° C. and 330° C., preferably the higher limit is 300° C., and thereafter the reaction mixture is cooled.

It may be of advantage to preheat the starting products either separately or combined as a mixture. The flow rate is regulated in such a way that the duration of passage of said mixture through the reaction zone lasts about 8 to 150 seconds, preferably 15 to 80 seconds. Attention should be paid to the fact that with increased temperatures in the heat exchanger the duration of passage of the reaction mixture therethrough has to be shortened.

The progress of the reaction of the reactants can easily be followed by determining the course of the curve of the internal temperature of the reactor by measuring of temperatures at various points over the length of the reactor. It has been discovered that an optimal yield of pure, light and odorless end product is obtained when the product passage in the reaction zone between the time of attaining the maximum temperature and leaving the heated zone does not amount to more than about 5 to 30%, preferably 5 to 26%, of the total duration of passage of the reactants through the reaction zone.

Furthermore, it is essential to cool the reaction product immediately after leaving the heated zone to temperatures below 100° C., otherwise an increasing discoloration of the product is noted.

Reaction products having an excellent quality are obtained with a high area-time yield, although the work is conducted at temperatures of such a high degree that were until now considered impossible for the realization of end products entirely free of byproducts. The products obtained may be utilized as textile assistants or as raw materials for the preparation of liquid or solid washing and cleansing agents.

The following examples are illustrative of the invention and enable better comprehension thereof. They are not, however, to be deemed limitative in any degree.

Examples 1 to 8 were carried out in a pressure tube having a length of 15 meters and an interior diameter of 6 mm. The tube is formed as a pipe coil with a coil diameter of 8 cm. and a spiral pitch of 15 mm. It is provided with temperature gauges after each 2.5 m. of tube length.

The compounds containing hydroxyl groups admixed with the catalyst and preheated to about 120° C. and the ethylene oxide were fed into the mixing chamber by means of suitable dosing pumps through separate pipes. In this mixing chamber the compounds were thoroughly admixed and directly thereafter pumped into the reactor, which was maintained at a pressure between 50 and 85 atmospheres. The finished reaction product was cooled in a compression cooler to a temperature below 100° C. and released into an evaporator.

Example 1

Lauryl alcohol was reacted with a sodium methylate solution. Next, the excess methanol was removed by evaporation under vacuum at 100° C. The methylate solution was added in such a way that 0.15% by weight of $Na^+$ was contained as catalyst in the lauryl alcohol. The catalyst-containing lauryl alcohol and ethylene oxide at a weight ratio of 2.1 to 1 (molar ratio 1:2) were pumped through the reactor as previously described at such a rate that in the quantitative reaction 20 kg. of an addition product of 2 mols of ethylene oxide to 1 mol of lauryl alcohol were produced per hour. The temperature in the heat exchanger was adjusted to 200° C. and maintained. The duration of passage of the product in the reactor lasted 65 seconds. Curve I shows the temperature during the progress of the reaction.

The reaction product was water clear, had a pleasant odor and a polyglycol content of 1.2%.

Example 2

Lauryl alcohol containing, as described in Example 1, 0.15% by weight of $Na^+$ as catalyst and ethylene oxide were pumped through the previously described reactor at a temperature in the heat exchanger of 211° C. at a molar ratio of 1:2 at such a rate that 42.5 kg. per hour of an addition product of 2 mols of ethylene oxide to 1 mol of lauryl alcohol were obtained. The duration of passage of the product in the reactor lasted 29 seconds. The temperature during the progress of the reaction is shown in curve II.

The reaction product was colorless (Lovibond 4″ cup: red=0.1, yellow=0.5) and clear, and had a polyglycol content of 1.3%.

If, in comparison therewith, at the same throughput the reaction was so conducted that the temperature of the reaction conformed to curve IIa, that is, if it differentiated from the process of the invention by a too early occurrence of a superelevated maximum temperature, caused by elevation of the temperature in the heating jacket to 245° C., a brown (Lovibond 4″ cup: red=11, yellow=77.6) and unusable product having an unpleasant odor was produced.

Example 3

Lauryl alcohol containing, analogous to Example 1, 0.1% by weight of $Na^+$ as catalyst and ethylene oxide, at a molar ratio of 1:2, were pumped through the reactor, previously described, at such rate that 82.5 kg. per hour of an addition product of 2 moles of ethylene oxide to 1 mol of lauryl alcohol were obtained. The temperature of the heat exchanger was maintained at 235° C. The duration of passage of the product in the reactor lasted 15 seconds. The temperature during the progress of the reaction is shown in curve III.

The product obtained was nearly colorless and contained 1.6% of polyglycol.

Example 4

Lauryl alcohol containing, analogous to Example 1, 0.75% by weight of $Na^+$ as catalyst and ethylene oxide were pumped, at a molar ratio of 1:2, through the reactor, previously described, at such a speed that 20 kg. per hour of an addition product of 2 mols of ethylene oxide to 1 mol of lauryl alcohol were produced. The temperature of the heat exchanger was maintained at 195° C. The duration of passage of the product in the reactor lasted 65 esconds.

Curve IV shows the progress of the reaction temperature.

The product obtained was water clear and contained 1.3% of polyglycol.

Example 5

Lauryl alcohol containing, as described in Example 1, 0.2% by weight of $Na^+$ as catalyst, and ethylene oxide in the molar ratio of 1:4 (weight ratio of 1.05 to 1) were pumped through the reactor, described in the preceding, at such a rate that 10 kg. per hour of an addition product of 4 mols of ethylene oxide to 1 mol of lauryl alcohol was obtained in quantitative reaction. The temperature of the heat exchanger was maintained at 185° C. The duration of the product in the reactor lasted 130 seconds.

Curve V shows the progress of the reaction temperature.

The product obtained was clear as water and had a polyglycol content of 1.6%.

However, if the reactor heat exchanger was heated to 190° C., a temperature course resulted thereby, deviating from the optimal curve, as indicated in curve Va. The maximum temperature was attained too early so that the reaction product remained in the reaction zone longer than 30% of the total duration after attaining maximum temperature. The product showed a brown color.

Example 6

Lauryl alcohol containing, analogous to Example 1, 0.1% by weight of $K^+$ as catalyst and ethylene oxide were pumped at a weight ratio of 2.1 to 1 (molar ratio of 1:2), through the reactor tube at such rate, that in quantitative reaction 57.5 kg. per hour of an addition product of 1 mol of lauryl alcohol to 2 mols of ethylene oxide were obtained. The duration of passage of the product in the reactor lasted 22 seconds. The temperature of the heat exchanger was maintained at 220° C. and the pressure in the reactor coil was adjusted to a pressure of 75–80 atmospheres. The peak temperature in the reaction zone was about 260° C. The end product was colorless.

Example 7

Nonylphenol containing, analogous to Example 1, 0.05% by weight of $Na^+$ as catalyst and ethylene oxide in a weight ratio of 1.67 to 1 (molar ratio of 1:3) were pumped through the reactor at such a rate that in quantitative reaction 8.8 kg. per hour of an addition product of 1 mol of nonylphenol to 3 mols of ethylene oxide was obtained. The temperature of the heat exchanger was kept at 200° C. The duration of passage of the product in the reactor lasted 150 seconds. The peak temperature in the second half of the reaction zone was about 243° C. A pressure of 60 to 70 atmospheres was maintained in the reaction tube. The product formed was practically colorless.

Curve VI shows the progress of the reaction temperature.

Example 8

A mixture of partly unsaturated alcohols with predominantly 18 C-atoms (iodine number=55, molecular weight=265), which, analogous to Example 1, contained 0.15% by weight of $Na^+$ as catalyst and ethylene oxide in the molar ratio of 1 to 4 were pumped through the reactor at such a rate that in quantitative reaction 11.2 kg. per hour of an addition product of 4 mols of ethylene oxide to 1 mol of the alcohol mixture were obtained. The temperature of the heat exchanger was maintained at 168° C. The duration of passage of the product in the reactor lasted 125 seconds.

Curve VII represents the temperature course of the reaction.

The reaction product had a light yellow color (Lovibond 4″ cup: red=1, yellow=9), a pleasant odor and a polyglycol content of 3.2%.

The reaction product obtained was subsequently pumped with ethylene oxide at a molar ratio of 1 to 4 again through the reactor at such rate that in quantitative reaction 14.3 kg. per hour of the addition product of 8 mols of ethylene oxide to 1 mol of the initial alcohol mixture were obtained. The temperature of the heat exchanger was maintained at 174° C. The duration of the product in the reactor lasted 106 seconds.

Curve VIIa shows the temperature course of the reaction.

The reaction product had a light yellow color (Lovibond 4″ cup: red=1.1, yellow=10) and contained 3.4% of polyglycol.

The tests, described in the following, were conducted with a reactor tube, having a diameter of 9 mm. and a length of 12.5 meters, in the following manner:

The temperature in the water-filled heat exchanger was regulated so that the pressure was maintained constant with the aid of a valve, expelling the reaction heat by means of evaporating the water. The vapor, escaping through the valve, was condensed in a cooling vessel under normal pressure and then pumped back into the apparatus maintaining a constant water level in the pressure jacket. The water level was adjusted in such a way that the entire coil of the tube was always surrounded by water as otherwise the heat transfer will not be sufficient.

To bring the fatty alcohol, ethylene oxide, mixture fed into the reactor to a reaction temperature as rapidly as possible, the circulating water was preheated and further heat was supplied to the pressure cooler by means of a steam heated coil. At high throughputs, the fatty alcohol was also preheated to a temperature of about 120° C.

Example 9

Lauryl alcohol containing, analogous to Example 1, 0.1% by weight of $Na^+$ as catalyst and ethylene oxide, at a weight ratio of 2.1 to 1 (molar ratio 1:2) were pumped through the reactor coil at such rate that in quantitative reaction 81.5 kg. per hour of the addition product of 2 mols of ethylene oxide to 1 mol of lauryl alcohol were obtained. The pressure in the pressurized water containing heat exchanger was adjusted to a pressure of 13.8 atmospheres and the pressure present in the reactor was adjusted to a pressure of 75 to 85 atmospheres. The peak temperature in the reactor was 278° C. and the duration of progress of the product in the reactor lasted 29 seconds. The product was practically colorless (Lovibond values in a 4″ cup: yellow=0.5, red=0.1, blue =0). Polyglycol content was about 1.6% (see curve VIII).

Example 10

A mixture of $C_{12}$–$C_{14}$ fatty alcohols containing analogous to Example 1, 0.1% by weight of $Na^+$ as catalyst and ethylene oxide were, at a weight ratio of 2.2 to 1 (molar ratio 1:2) pumped through the reactor of Example 9 at such speed that in quantitative reaction 96 kg. per hour of addition product were formed. The pressure in the pressurized water-containing heat exchanger was adjusted to a pressure of 18 atmospheres and the pressure in the reactor was adjusted to a pressure of 80 to 90 atmospheres. The peak temperature in the reactor was about 287° C. The duration of progress of the product in the reactor lasted 25 seconds. The product was nearly colorless (Lovibond values in a 4″ cup: yellow=1.0, red= 0.1, blue=0). The content of polyglycol was about 1.7% (see curve IX).

A change in the pressure in the pressurized water-containing heat exchanger to a pressure of 22 atmospheres effected a premature obtention of a peak temperature of 317° C. and supplied, according to expectations, a product of a dark color and of strong odor.

The temperature course of this reduction is shown in curve IXa.

Example 11

A mixture of isomeric secondary $C_{14}$-alcohols, obtained by air oxidation of n-tetradecane containing, analogous to Example 1, 0.04% by weight of $Na^+$ as catalyst and ethylene oxide, at a weight ratio of 2.5 to 1 (molar ratio 1:2) were pumped through the reactor of Example 9 at such rate that in the quantitative reaction 56.5 kg. per hour of the addition product of 2 mols of ethylene oxide to 1 mol of the secondary alcohol were obtained.

The pressure in the pressurized water containing heat exchanger was adjusted to 18.6 atmospheres and the pressure present in the reactor was adjusted to 90 to 100 atmospheres. The peak temperature in the reactor was about 281° C. and the duration of passage of the product in the reactor lasted 42 seconds. The light-colored product had the following analysis: (Lovibond values in a 4″ cup: yellow=9, red=0.5); Iodine number=5.2; ethylene oxide content=26.7%.

Curve X indicates the temperature course of the reaction.

EXAMPLE 12

An addition product of 2 mols of propylene oxide to 1 mol of lauryl alcohol contained, based on NMR-spectroscopic analysis, 83 mol percent of secondary OH groups, was pumped together with ethylene oxide at a weight ratio of 3.44 to 1 (molar ratio 1:2), in the presence of 0.19% by weight of sodium as catalyst, through the reactor of Example 9 at such a rate that in the quantitative reaction 76.9 kg. per hour of an addition product of 2 mols of ethylene oxide to 1 mol of the starting alcohol were produced. The pressure in the pressurized water containing heat exchanger was adjusted to a pressure of 11.0 atmospheres, and the pressure in the reactor was adjusted to 75 to 85 atmospheres. The peak temperature in the reactor was 266° C. The duration of passage of the product in the reactor lasted about 31 seconds. The light-colored product has the following analysis: (Lovibond values in a 4″ cup: yellow=8, red=0.6, blue=0); iodine number=7.8; ethylene oxide content=24.0% and propylene oxide content=30.7%.

Curve XI indicates the temperature course of the reaction.

The foregoing examples are illustrative of the invention. It is to be understood, however, that other expedients known to those skilled in the art may be employed.

We claim:

1. A process for the continuous production of addition products of ethylene oxide with organic compounds having reactive hydrogen atoms comprising in combination the following steps: (a) continuously passing a mixture of organic compounds having reactive hydrogen atoms selected from the group consisting of alcohols, phenols, addition products of ethylene oxide thereof and addition products of propylene oxide thereof, with ethylene oxide in a molar ratio of organic compound with reactive hydrogen atoms to ethylene oxide of 1:1 to 1:4 in the presence of an alkaline catalyst under a pressure at which the reaction mixture is kept in liquid form, through a jacketed reactor having a small cross-section compared to its length, (b) heating said mixture to such a degree that, after travelling through the first half of said jacketed reactor, a temperature of about 170 to 230° C. is attained, and that in the second half of said jacketed reactor said mixture passes through a maximum temperature of between about 240 to 330° C., (c) maintaining said mixture in said jacketed reactor for about 8 to 150 seconds, (d) maintaining the interval between the obtention of said maximum temperature and the time said mixture leaves said jacketed reactor between about 5% to 30% of the total duration of time said mixture is maintained in said jacketed reactor, (e) cooling said addition product to a temperature below 100° C. after said addition product leaves said jacketed reactor, and (f) recovering said addition product.

2. The process of claim 1, step (b), wherein said mixture passes through a maximum temperature of between about 240° C. and about 300° C.

3. The process of claim 1, step (c), wherein said mixture is maintained in said jacketed reactor for between about 15 to 80 seconds.

4. The process of claim 1, step (d), wherein the interval between the obtention of said maximum temperature and the time said mixture leaves said jacketed reactor is maintained between about 5% to 26% of the total duration of time said mixture is maintained in said jacketed reactor.

5. The process of claim 1 wherein said organic compound having reactive hydrogen atoms is a primary alkanol having 6 to 22 carbon atoms.

6. The process of claim 1 wherein said organic compound having reactive hydrogen atoms is a primary alkenol having 6 to 22 carbon atoms.

7. The process of claim 1 wherein said organic compound having reactive hydrogen atoms is an alkylphenol having 4 to 18 carbon atoms in the alkyl.

8. The process of claim 1 wherein said organic compound having reactive hydrogen atoms is an ethoxylated primary alkenol having 6 to 22 carbon atoms.

9. The process of claim 1 wherein said organic compound having reactive hydrogen atoms is a secondary alkanol having 6 to 22 carbon atoms.

10. The process of claim 1 wherein said organic compound having reactive hydrogen atoms is a propoxylated primary alkanol having 6 to 22 carbon atoms.

References Cited

FOREIGN PATENTS

| | | |
|---|---|---|
| 652,512 | 11/1962 | Canada. |
| 1,061,764 | 7/1959 | Germany. |
| 757,309 | 9/1956 | Great Britain. |

BERNARD HELFIN, *Primary Examiner.*

U.S. Cl. X.R.

260—611, 615